United States Patent
Bunn

[15] 3,651,948
[45] *Mar. 28, 1972

[54] AGGLOMERATED POROUS MASS AND METHOD OF PREPARING SAME

[72] Inventor: Clinton O. Bunn, Denver, Colo.

[73] Assignee: Col-Mont Corporation, Butte, Mont.

[ * ] Notice: The portion of the term of this patent subsequent to Oct. 27, 1987, has been disclaimed.

[22] Filed: July 1, 1970

[21] Appl. No.: 51,541

[52] U.S. Cl. ............................ 210/502, 117/148, 210/36, 210/DIG. 21
[51] Int. Cl. ............................ B01d 39/04, C02b 9/02
[58] Field of Search ............ 210/36, 40, DIG. 21, 502, 504, 210/506; 117/72, 148, 149

[56] References Cited

UNITED STATES PATENTS

| | | |
|---|---|---|
| 3,382,170 | 5/1968 | Pape ........................................ 210/36 |
| 3,536,615 | 10/1970 | Bunn ..................................... 210/40 X |

*Primary Examiner*—Reuben Friedman
*Assistant Examiner*—Thomas G. Wyse
*Attorney*—Oberlin, Maky, Donnelly and Renner

[57] ABSTRACT

The method of recovering oil leakage from the surface of a body of water, comprising the steps of mixing discrete core particles of wood material, polyethylene and finely ground coal to form particles having a high affinity for oil. The particles have a high degree of integrity, thereby permitting storage of the same at points relatively remote from the point of leakage and airlifting of the same to the oil spot. The oil-saturated particles are processed after collection for further use as a fuel source, with the B.t.u. content being as great or greater than bituminous coal.

10 Claims, 1 Drawing Figure

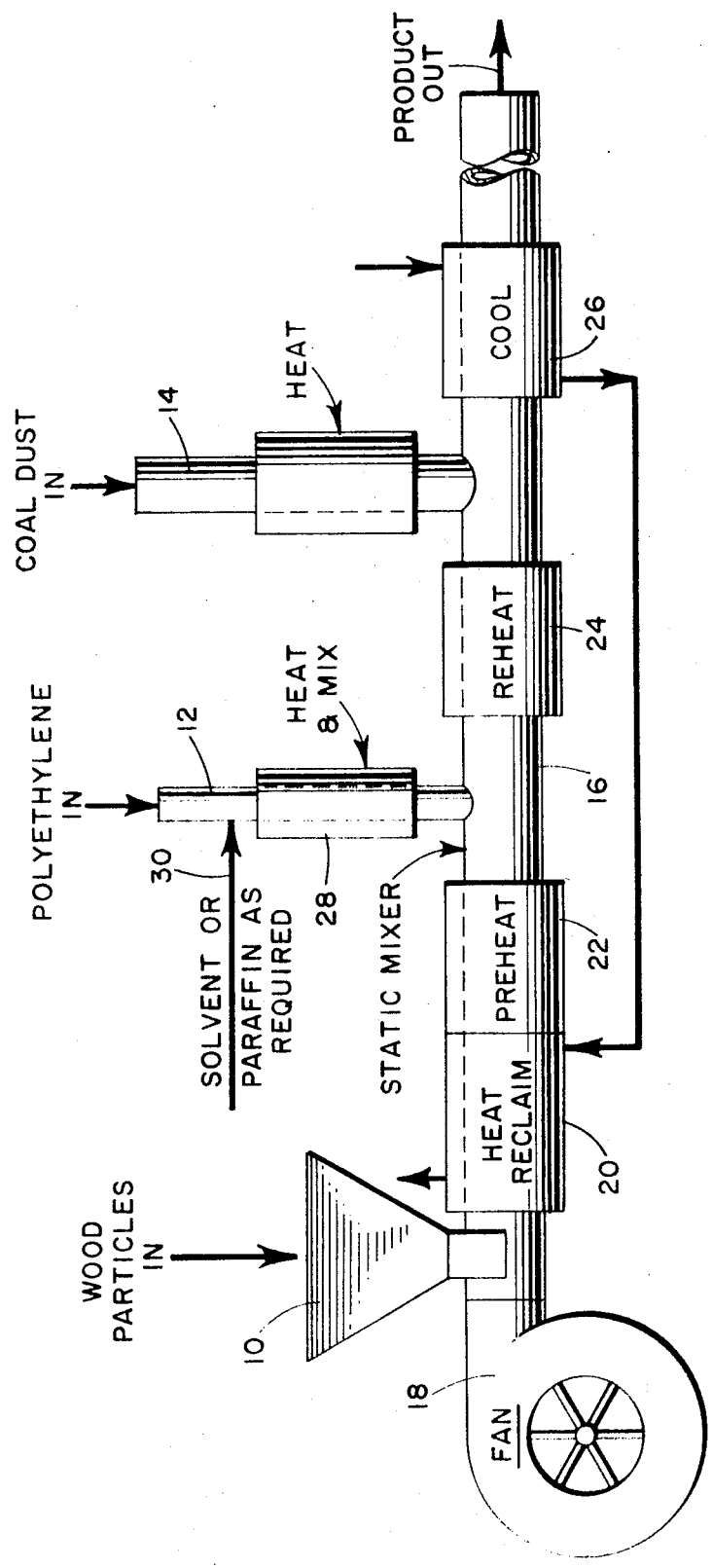

AGGLOMERATED POROUS MASS AND METHOD OF PREPARING SAME

BACKGROUND OF THE INVENTION

The present invention relates as indicated to a method of and apparatus for recovering oil from the surface of water. Although applicable to essentially any situation where oil is present on the surface of the water and is desired to be removed therefrom, it is particularly well suited to large scale oil recovery where leakage has resulted from the disability of or damage to large vessels such as oil tankers, or where the leakage has resulted from offshore drilling operations. This latter situation in particular has posed a vexing problem to the industry which thus far has not been satisfactorily solved.

The problem of oil leakage and a proposed solution was disclosed in my earlier application, Ser. No. 848,039, filed Aug. 6, 1969, and entitled "METHOD OF AND APPARATUS FOR TREATING OIL LEAKAGE," now U.S. Pat. No. 3,536,615 dated Oct. 27, 1970. The present application comprises an improvement over my earlier application in that I have discovered that certain materials disclosed in my earlier application are more effective for the purpose intended, and other forms of apparatus have proved to be equally successful in the formation of the oil-collecting particles, which particles have a high affinity for oil and are adapted to be spread on the surface of the water for selectively collecting the oil.

SUMMARY OF THE INVENTION

A primary object of the present invention is to provide a method of and apparatus for recovering oil from the surface of water wherein three low cost ingredients are provided for forming the oil-absorbing particles, namely, wood, carbon and a combustible adhesive, with polyethylene presently being the economically preferred material. The wood may be present in essentially any size or form, but is preferably in the form of relatively small chips in the range of up to ½ inch in size, with ¼ inch being most preferable. Sawdust is also feasible in accordance with an alternative form of the invention. The polyethylene adhesive is preferably of the readily available, low density type, and the carbon is preferably present in the form of finely ground coal, another material found greatly in abundance in many portions of the country. Absolutely essential in the combination of these ingredients is the formation of particles which have a specific gravity initially less than one and which have a relatively porous open cellular structure. Such structure increases the coal surface contact area thereby providing maximum oil adsorption per unit weight of material.

A further important object of the present invention is to provide such a method of recovering oil wherein the oil affinitive particles are comprised not only of low cost materials, but materials which at the present time comprise pollutants to our environment. The wood material is formed from or comprises essentially waste material, with sawdust being satisfactory in the practice of the invention. The polyethylene employed is finely ground, cut or chopped to the desired size, and can be obtained from processing what are essentially single use materials, which must be otherwise disposed of in increasing quantities in our solid refuse disposal operations, the problems of which are plaguing municipalities everywhere. The third ingredient, coal dust, is presently considered an irritating, dangerous by-product of coal production. A common method of ridding the mines of coal dust, particularly with non-coking coal, is to dilute the same in lime dust underground so as to reduce the danger of fire. The beneficial use of coal dust in accordance with the present invention is thus of important significance to the coal industry.

A further object of the present invention is to provide such a method and apparatus wherein the product obtained is not significantly affected either by the sequence of addition of ingredients or by the need for critically small percentage ranges of each ingredient, within the above mentioned parameters of specific gravity and surface area.

A further object of the present invention is to provide a method of and apparatus for recovering oil wherein the oil collection particles possess a relatively high degree of integrity. This not only permits storage of the particles for relatively long periods of time prior to use, but enables the particles to retain their physical characteristics and oil-absorptive capabilities when subjected both to violent agitation over long periods during use, and subsequently following absorption. Such particle integrity also permits the material to be transported to the site where needed without adversely affecting the collection process. It is therefore envisioned that the oil collecting particles could be stored at relatively remote site locations and flown, in the quantities needed, to the location of the oil. Particle integrity is also important in the handling of the oil-laden particles after collection in order to avoid disintegration.

A further object of the present invention is to provide a method of and apparatus for recovering oil wherein the particles may possess a predetermined water absorption rate over time when in continued contact with water. In accordance with the invention, the constituents of the particles have been selected and proportioned to provide a mixture which is initially lighter than water. Subsequent and continued contact with water will increase the density of the float particle due to the absorption of water by the portion of the wood chip which is not coated with the polyethylene. After the float particle absorbs a predetermined weight of water, the lighter than water particle becomes heavier than water. In this manner any of the oil-absorbing float particles which are not recovered during the collecting operation of the system will eventually sink to the bottom so as to eliminate the particles from being themselves a future pollution problem. The principal purpose of my invention, which is removal of polluting oil from the surface of the water, has therefore been served, in spite of the non-recovery of the float particle.

A still further object of the present invention is to provide a method of and apparatus for recovering oil wherein the particles, following the oil recovery process, can be treated further for use as a convenient and economical fuel source. The constituents of the particles have been selected to provide the desired fuel properties, with the particles when adsorbed/absorbed with oil having a heat value as great or greater than bituminous coal. It should be noted that the words "adsorbed" and "absorbed" are used synonymously herein. The degree of adsorption or absorption of the oil by the particles varies significantly depending on many factors, including the percentage of the respective ingredients, the time of exposure of the particle to the oil and water, etc. Accordingly, although the description hereinafter will be primarily limited to the term "adsorbed" it will be understood that the concepts of the invention envision absorption as well, either sequentially due to time considerations or simultaneously owing to the particular makeup of the oil collecting particles.

These and other objects of the invention will be apparent as the description proceeds in particular reference to the attached drawing, in which:

BRIEF DESCRIPTION OF THE DRAWING

The FIGURE is a schematic view of the preferred process of making the oil affinitive, coated particles.

DESCRIPTION OF THE PREFERRED EMBODIMENT

There is shown in the drawing apparatus by means of which the preferred method of the present invention can be accomplished. The apparatus has been shown schematically inasmuch as no invention resides in the specific parts or components of the apparatus employed, but only in the overall use to which the apparatus is put. All parts of the apparatus are commercially available items, as will be pointed out hereinbelow when the method is specifically described.

As previously mentioned, applicant's novel method comprises the mixing of three basic ingredients, wood, polyethylene, and coal. These ingredients may be mixed in any suitable mixing apparatus which functions to intimately mix the coal and polyethylene. It is not essential that the entire surface of the wood particles be covered, although the polyethylene additionally functions as a sealant and to the extent that the surface of the wood is not sealed, the wood will indiscriminately adsorb water as well as oil, which may lead to undesired sinking of the particles without fulfilling their intended function of oil collection. The complete sealing of the wood will preclude the adsorption of water thereby insuring the selective oil collection by the particles.

In the application drawing, the inlets for the materials have been generally indicated at 10, 12 and 14, respectively. The materials are fed through the inlets to a mixer generally indicated at 16, which may comprise a series of longitudinally spaced and connected mixing devices of commercially available construction. Various types of mixers are now available for intimately mixing essentially any flowable solids, liquids or gases, with one such mixture being sold by Kenics Corporation, Danvers, Massachusetts, and sold under the trademark STATIC MIXER. This mixer is disclosed and claimed in U.S. Pat. No. 3,286,992, and reference is specifically made thereto for a full understanding of the structure and function of the mixing device. Briefly, the device is provided on the interior thereof with a plurality of curved blades or elements, each of which affects the reversal of the flow from the immediately preceding element whereby the feed material is constantly being divided and intimately mixed with the other materials fed into the mixer.

The material is forced through the mixer by means of a blower generally indicated at 18 mounted at the forward end of the apparatus adjacent the inlet 10. Disposed circumferentially around the mixer 16 in longitudinally spaced relation are heat exchangers indicated at 20, 22, 24 and 26. These exchangers are provided for the purpose of either heating or cooling the material as it longitudinally passes through the interior of the mixer. For example, heat exchanger 20 initially heats the wood particles as they enter the mixer, and preheat exchanger 22 further heats the material. The heat exchanger 24 comprises a reheater which serves to elevate the temperature of the wood and polyethylene mixture, with the polyethylene being fed to the mixer immediately preceding the reheater 24. The exchanger 26 comprises a cooler-heat exchanger which serves to cool the entire mixture after the coal has been introduced into the mixer through the inlet 14. The product coming out of the mixer is preferably at a temperature sufficiently low to permit normal handling thereof. For purposes of efficient heat utilization, the heat resulting from the heat transfer at heat exchanger 26 may be used as the heat source for the heat exchanger 20.

The wood particles entering the mixer through inlet 10 can be obtained from any suitable available source of material, and are preferably converted into chips approximately one-fourth inch in size. From an economic standpoint, chips of this size can be manufactured completely from waste wood materials such as bark, edgings, rough trim, cull lumber, chippable residues, and the like. It will be understood that wood in the form of chips in excess of ¼ inch are also satisfactory, as well as wood in smaller size forms. In fact, sawdust can be satisfactorily employed in accordance with the present invention. If desired, the wood material may be treated before introduction into the mixer through inlet 10. For example, the wood may be coated with a sealant which may comprise the materials noted in my earlier application such as, for example, shellacs, polyester and furan resins, natural resins, asphaltic materials, in addition to other well known sealants such as silicones.

The polyethylene is fed into the mixer through inlet 12 after the wood has been introduced and preheated. The polyethylene is preferably of low grade, low density and low molecular weight, and can even comprise reground material for reasons of economy. The material when fed into the mixer is preferably in solid, ground form and can be supplied by air to the interior of the mixer. The polyethylene is preferably preheated prior to entry into the mixing chamber for the purpose of elevating the temperature thereof to approximately the temperature of the wood particles thereby reducing the heating requirements for the main chamber itself.

The viscosity of the polyethylene can be varied substantially by varying the feed temperature thereof or through the addition of solvents thereto through a solvent feedline 30. Solvents suitable for this purpose include, xylene, toluene, paraffin or similar known solvents and thinners. At 80° C., polyethylene is miscible in organic solvents such as toluene and xylene, and the fluid condition of the polyethylene and solvent carrier facilitates the mixing operation, as well as permitting reduction of the temperature at which the coal is mixed with the polyethylene coated wood. The solvent is boiled off at a predetermined elevated temperature.

In addition, although not shown, other materials can be blended with polyethylene to obtain the desired properties. For example, nylon or polymers could be blended with the polyethylene to provide permeability properties more compatible with a particular size or type wood feed material. Significantly, any component added to polyethylene should possess essentially the same characteristic of combustibility in order to provide a product which when collected serves as a useful source of fuel.

The polyethylene is intimately mixed in the interior of the mixer with the wood chips and carried toward the exit end of the mixer, under the influence of the blower 18. The mixture of polyethylene and wood chips is heated by the heat exchanger 24 to approximately 160° C., at which elevated temperature the adhesive properties of the polyethylene are fully developed in the temperature regions below the char point of the wood, and at this temperature the properties of the coal are not adversely affected. At temperatures much below 160° C., the adhesive properties of the polyethylene are not fully developed, and at temperatures in excess of 160° C., the likelihood of combustion of the wood and coal is greatly increased. It will be understood that the optimum temperature will vary depending upon the type and moisture content of the wood, the type, size and moisture content of the coal, the presence of additives to the polyethylene, and the residence time in the heating chamber.

The coal dust is admitted into the mixer downstream of the reheat exchanger 24. The coal dust can be of substantially any mesh size although superior results are obtained where the coal dust is minus 200-mesh in size. The quality of the coal can also significantly vary, with sub-bituminous as well as bituminous coal being entirely satisfactory.

The carbon coated particles are thereafter passed through cooling heat exchanger 26 for further processing.

To summarize the invention thus far described, the wood chips are delivered to the mixer and heated therein and thereafter coated with ground polyethylene admitted to the mixture through the inlet 12. The mixing device greatly enhances the binding of the coal to the wood chips, and predetermined amounts of wood chips and polyethylene are delivered to the mixer for effectively conditioning the wood particles prior to passage of the same to the area in the mixer adjacent the coal dust inlet 14. The water absorption rate of the particles can be controlled by the amount of polyethylene added, with relatively lesser amounts of polyethylene resulting in less than complete sealing of the wood chips, thereby conditioning the particles for absorption of water and/or oil.

As the polyethylene coated particles pass below the coal dust inlet 14, coal is added to the wood chips in such predetermined amounts as to bind coal to essentially all the wood particles passing adjacent thereto. As previously stated, the wood chips are heated during the traversal thereof through the mixer and are preferably at a temperature at least as high as 160° C. prior to the dusting of the same with the coal particles.

After the application of the coal dust to the particles, the particles pass through the cooler-heat exchanger 26 for cooling the same and setting the bond between the wood chips and the coal dust. The particles can be removed from the mixer in any suitable manner and with known apparatus. For example, the particles could be collected at the end of the mixer and conveyed therefrom to apparatus for further handling of the particles.

As above noted, one of the principal advantages of the present invention is the lack of criticality in the sequence of addition of the material ingredients which form the final, coated product. In lieu of the arrangement as shown in the application drawing wherein polyethylene is applied to the surface of the wood chips and the resultant coated particles thereafter mixed with coal, an alternative method comprises the intimate mixing of wood and coal, with the resulting discrete particles being thereafter mixed with finely ground polyethylene. This process can be carried out in the same type mixing apparatus illustrated in the application drawing.

In the alternative process, the sawdust and coal are conveyed to the mixer 16 illustrated in the application drawing and intimately mixed therein. The coal is preferably minus 200-mesh and can be, as previously indicated, sub-bituminous in quality. The sawdust, as contrasted to the relatively larger wood chips, provides for increased permeability, reduced bulk density, and a greater coal/wood ratio. To enhance the intimate mixing of the wood and coal, the former is preferably dampened, for example with water, so as to permit the sawdust to be thoroughly coated with the finely ground coal and polyethylene.

The coated sawdust is thereafter intimately mixed with finely ground polyethylene, with the latter preferably covering essentially the entire surface of the particles. The polyethylene is added in predetermined amounts to effect such thorough mixing, and highly satisfactory results have been achieved where the wood to polyethylene to coal ratio is 1:2:3, respectively.

The sawdust thus sequentially coated with coal and polyethylene is thereafter heated at approximately 160° C. until the polyethylene becomes adhesive. The heating step can be effected in a manner similar to that above described and illustrated in which the coated particles are passed through a heat exchanger for a time sufficient to reach such temperature and effect the adhesion process. Any suitable source of heat may be employed. The fused particles or agglomerates are thereafter cooled providing discrete particles having a great affinity for oil. It will be understood that in lieu of the mixing device illustrated, other apparatus may be employed for mixing and heating the components in both of the described methods. For example, batch pans, conveyor belts, fluidized beds, twin pug mixers or rotary mixers can be employed to effect the mixing and heating. The important consideration is the ability of the apparatus employed to mix thoroughly and develop heat quickly so as to effect bonding of the coal to the wood material.

The integrity of the finally treated particles is an important characteristic, permitting the transportation and/or storage of the particles over long periods of time without significant deterioration of the product, provided excessive oxidation of the particles is prevented.

In the actual employment of the particles in the oil recovering operation, the particles can be spread over the surface of the water in any suitable manner. Disclosed in my earlier application is the method of handling comprising the spreading of the particles on the surface of the water by means of a spreader ship, with the oil-adsorbed particles being collected by a recovery ship for further processing. This method could be used as well in accordance with the present invention, although it is contemplated that in view of the integrity of the oil affinitive particles, the same can be stored at relatively remote locations and transported by air to the location where needed. Relatively large amounts of the product could be airlifted and air scattered on the area of the water surface bearing the oil. A recovery ship would then be dispatched to the location and the oil-adsorbed particles collected.

On the basis of experimental tests, conducted in accordance with the alternative method just described, approximately three tons of float material will collect approximately 2 tons of oil. In view of the ready availability and cheapness of the ingredients comprising the oil affinitive particles of the present invention, it will be seen that the oil can be recovered very economically. It should also be kept in mind that, unlike previous oil recovery methods and materials, the present method makes use of the collected particles as a readily available source of fuel. In this regard, further treatment of the particles is normally desirable and may, for example, comprise, as disclosed in my earlier application, drying and/or compacting of the particles into briquet shaped sizes for more convenient handling and storing. It will be apparent that the oil can be recovered, as an alternative treatment, by flask distillation.

In regard to the fuel value of the particles both before and after the oil recovery process, testing has shown that the B.t.u. content of the particles before the oil adsorption is approximately 14,200 B.t.u. per pound, approximately the value of bituminous coal, and the fuel value after adsorption is approximately 18,000 B.t.u. per pound. All of the disclosed ingredients add to the fuel value of the product, and it will be understood that the fuel value will vary significantly with the separate heating values of the wood and coal employed in the formation of the oil affinitive particles.

I, therefore, particularly point out and distinctly claim as my invention:

1. The method of preparing an agglomerated porous mass, comprising the steps of:
   1. providing discrete core particles of light weight material, such material being combustible and sufficiently light to float on water,
   2. heating said core particles,
   3. applying to the surface of said heated particles polyethylene and powdered coal, and
   4. heating said coated particles to a temperature sufficiently high to melt said polyethylene but below the burning point of said core material and said powdered coal, said polyethylene serving as an agglomerating and bonding agent and causing the bonding of said coal to said core particles thereby to form an agglomerated porous mass light in weight and combustible, and having a high affinity for oil.

2. The method of claim 1 wherein said discrete core particles of light weight material are wood.

3. The method of claim 2 wherein said wood particles are in the form of wood chips approximately ¼ inch in size.

4. The method of claim 1 wherein said powdered coal is minus 200-mesh or smaller in size.

5. The method of claim 1 wherein the temperature at which said polyethylene bonds said coal to said core particles is approximately 160° C.

6. The method of claim 1 further including the steps of spreading the agglomerated porous material on the surface of the water to absorb the oil, collecting the oil adsorbed particles from the surface of the water, and treating the collected particles for rendering the same substantially immediately useable as a fuel source.

7. The method of claim 1 wherein said core particles and said polyethylene and said coal are independently fed into and conveyed through a confined housing, and intimately mixed therein.

8. The method of preparing an agglomerated porous mass, comprising the steps of:
   1. providing discrete core particles of light weight material, such material being combustible and sufficiently light to float on water,
   2. passing said particles by induced air in a continuous path through a confined housing,
   3. heating said particles while said particles are passed through said housing,
   4. applying to said heated core particles polyethylene as an agglomerating and bonding agent,
   5. heating said polyethylene to a temperature of approximately 160° C. and 6. applying powdered coal to the polyethylene-coated core particles causing the agglomeration of the particles into a porous matrix, said particles as thus agglomerated with coal being light in weight and combustible, and having a high affinity for oil.

9. The method of preparing an agglomerated porous mass, comprising the steps of:
   1. providing discrete core particles of light weight fibrous material, such material being combustible and sufficiently light to float on water,
   2. thoroughly mixing said fibrous particles with finely ground carbonaceous material,
   3. mixing said coated fibrous particles with finely ground polyethylene,
   4. heating said particles at approximately 160° C. until said polyethylene melts and fuses with said carbonaceous material coating said fibrous material, and
   5. cooling said fused particles thereby to provide discrete agglomerates which are light in weight so as to float on water, combustible, and characterized by a high affinity for oil.

10. An agglomerated porous mass light in weight and having a high affinity for oil, said mass comprising a plurality of discrete core particles of fibrous material, and powdered coal bonded to said discrete core particles by fused polyethylene.

* * * * *